(12) United States Patent
Agarwal et al.

(10) Patent No.: US 11,934,675 B2
(45) Date of Patent: Mar. 19, 2024

(54) MIXED MODE BLOCK CYCLING FOR INTERMEDIATE DATA

(71) Applicant: Western Digital Technologies, Inc., San Jose, CA (US)

(72) Inventors: Dinesh Kumar Agarwal, Bangalore (IN); Sourabh Sankule, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/183,991

(22) Filed: Feb. 24, 2021

(65) Prior Publication Data

US 2022/0083221 A1 Mar. 17, 2022

Related U.S. Application Data

(60) Provisional application No. 63/077,573, filed on Sep. 12, 2020.

(51) Int. Cl.
*G06F 3/06* (2006.01)

(52) U.S. Cl.
CPC ............ *G06F 3/064* (2013.01); *G06F 3/0604* (2013.01); *G06F 3/0619* (2013.01); *G06F 3/0629* (2013.01); *G06F 3/0679* (2013.01)

(58) Field of Classification Search
CPC ...... G06F 3/064; G06F 3/0644; G06F 3/0619; G06F 3/0629; G06F 3/0688; G06F 3/0653; G06F 3/0652; G06F 3/0634; G06F 3/0604; G06F 3/0679; G06F 3/0616; G06F 11/108; G06F 12/02; G06F 2212/7211;

(Continued)

(56) References Cited

U.S. PATENT DOCUMENTS 5,930,167 A  *  7/1999  Lee ..................... G11C 11/5621
                                                    365/185.24
9,123,422 B2     9/2015  Yu et al.
9,594,633 B2 *   3/2017  Colgrove ............. G06F 3/0646
                        (Continued)

OTHER PUBLICATIONS

Andy Chen, "Flash type comparison for SLC/MLC/TLC and Advantech's Ultra MLC technology", Advantech Corporation, Technical Whitepaper, Aug. 2016, pp. 1-9 (Year: 2016).*

(Continued)

*Primary Examiner* — Curtis James Kortman
(74) *Attorney, Agent, or Firm* — Rutan & Tucker LLP; Hani Z. Sayed; Ravi Mohan

(57) ABSTRACT

Data blocks may be optimized and managed in a mixed mode that utilizes a single-level cell (SLC) mode in combination with higher-density memory modes to promote full block utilization and to increase overall cycles of the data blocks. A data block cycling process in the mixed mode can place a data block in a higher-density memory mode that includes a multi-level cell (MLC) mode, a triple-level cell (TLC) mode, or a quad-level cell (QLC) mode, if the SLC cycle count of the data block is relatively higher as compared to other data blocks. Similarly, in the mixed mode, a data block may be placed in the SLC mode to store parity data or intermediate data if the corresponding TLC cycle count is relatively higher than other data blocks. Data clocks cycles may also be evenly distributed in the mixed mode, thereby balancing the mixed mode usage across all data blocks.

16 Claims, 8 Drawing Sheets

(58) Field of Classification Search
CPC ......... G06F 12/0246; G06F 2212/1032; G06F 2212/7205; G11C 2211/5641
See application file for complete search history.

(56) References Cited

U.S. PATENT DOCUMENTS

| | | | |
|---|---|---|---|
| 10,008,250 | B2 | 6/2018 | Ramalingam |
| 10,090,044 | B2 | 10/2018 | Achtenberg et al. |
| 10,325,668 | B2 | 6/2019 | Muchherla et al. |
| 10,359,933 | B2 | 7/2019 | Muchherla et al. |
| 2013/0080730 | A1* | 3/2013 | Kim ................. G06F 3/0679 711/E12.008 |
| 2015/0154112 | A1* | 6/2015 | Tuers ................ G06F 12/0246 714/773 |
| 2018/0293001 | A1* | 10/2018 | Muchherla ........... G11C 16/349 |
| 2019/0332298 | A1* | 10/2019 | Madabhushi ....... G06F 12/1009 |
| 2020/0143891 | A1* | 5/2020 | Takeyama ............ G11C 7/1045 |
| 2021/0133070 | A1* | 5/2021 | Pletka ................. G06F 12/0246 |
| 2021/0157674 | A1* | 5/2021 | Muchherla ............ G06F 9/5016 |
| 2021/0173577 | A1* | 6/2021 | Kale ....................... G06F 3/048 |
| 2021/0209016 | A1* | 7/2021 | Muchherla .......... G06F 11/3037 |
| 2021/0397510 | A1* | 12/2021 | Liu ................... G11C 16/0483 |

OTHER PUBLICATIONS

T. Yang, H. Wu and W. Sun, "GD-FTL: Improving the Performance and Lifetime of TLC SSD by Downgrading Worn-out Blocks," 2018 IEEE 37th International Performance Computing and Communications Conference (IPCCC), Orlando, FL, USA, 2018, pp. 1-8, doi: 10.1109/PCCC.2018.8710996. (Year: 2018).*

* cited by examiner

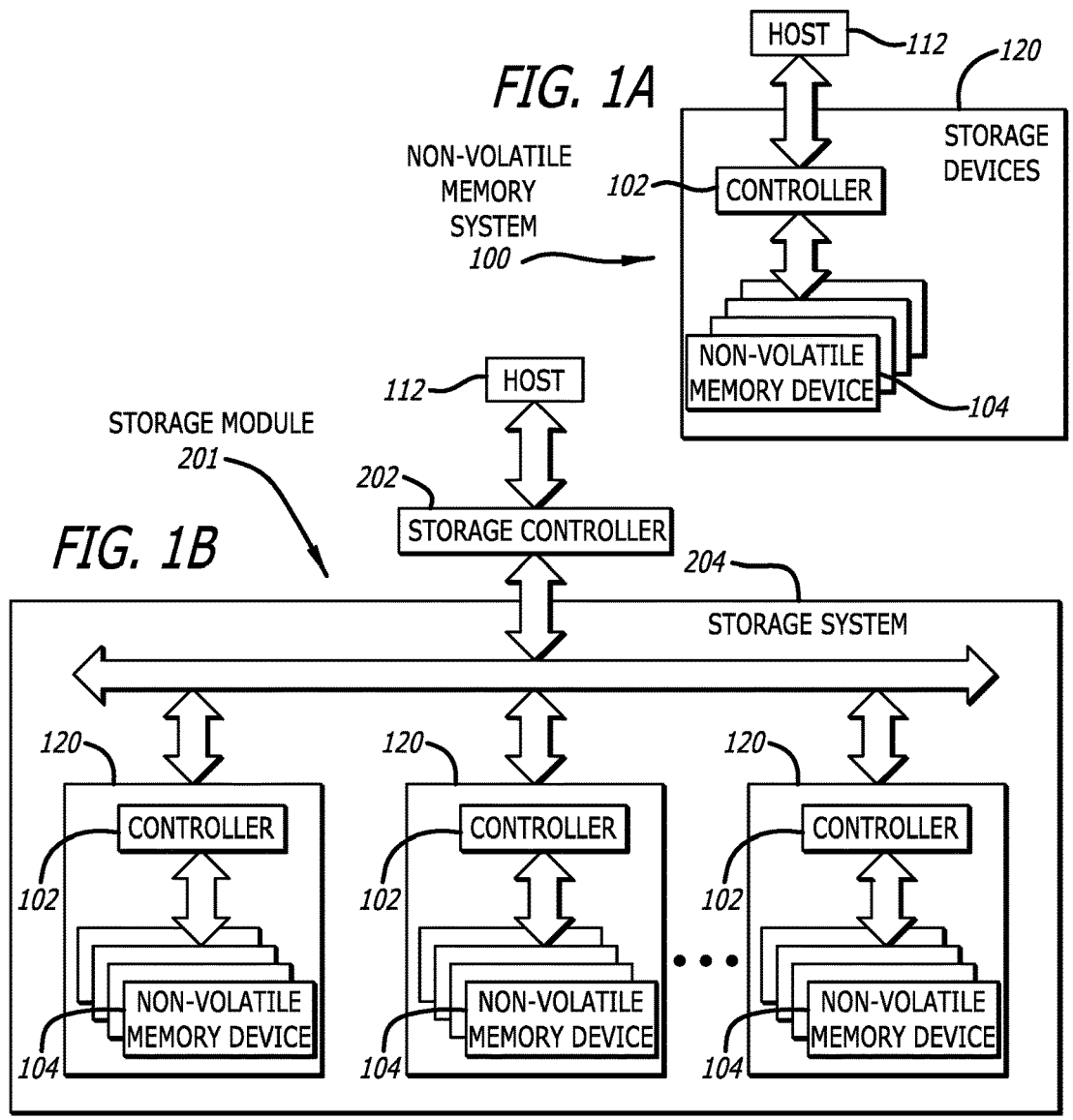
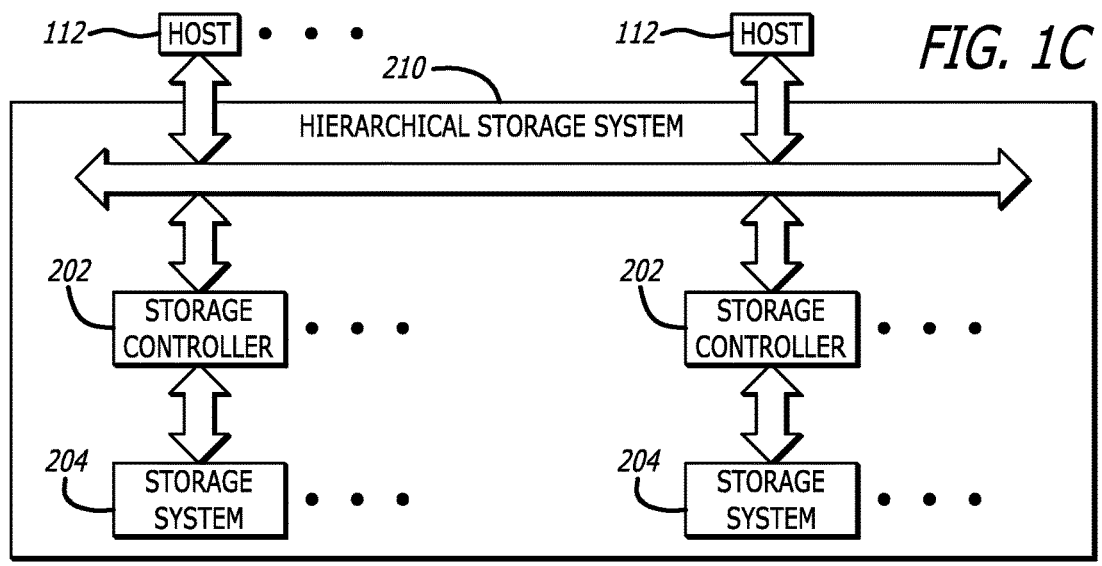

MIXED MODE BLOCK CYCLING FOR INTERMEDIATE DATA

PRIORITY

This application claims the benefit of and priority to U.S. Provisional Application No. 63/077,573, filed Sep. 12, 2020, which is incorporated in its entirety herein.

FIELD

The embodiments of the present disclosure relate to storage devices. More particularly, the embodiments relate to a mixed mode for storing intermediate data to reduce the overall data footprint of the storage devices.

BACKGROUND

Solid-state storage devices have evolved since their debut. Initially, solid-state storage devices utilized a single type of memory cell, known as a single-level cell (SLC). SLCs were configured to store a single bit of data within each memory cell. In an effort to store even more data per memory cell, higher-density memory cells were developed. For example, a multi-level cell (MLC) doubles the capacity of SLCs with two bits per cell. Similarly, a triple-level cell (TLC) contains three bits per cell, while a quad-level cell (QLC) contains four bits per cell.

While increased density advantageously lowered costs and increased storage capability, the increase in density presents a trade-off in performance and device lifespan due to an increased number of read operations required per memory cell. Unfortunately, increased read operations also tend to increase the likelihood of read disturb errors.

Efforts to overcome the disadvantages of higher-density solid-state storage devices led to the development of hybrid solid-state storage devices, including both SLC and MLC, TLC, or QLC NAND-flash packages. Hybrid solid-state storage devices are generally configured so that read-time sensitive (RTS) data or frequently accessed data is typically placed in groups of SLC memory device blocks (i.e., data blocks) to decrease read time for the RTS data, as well as to reduce the likelihood of read disturb errors. This dual memory storage device operation is often referred to as utilizing a "mixed mode." However, the dual nature of embedded memory devices can lead to an imbalance in the overall usage of the various memory cell densities, thereby decreasing storage device lifespans.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 1A illustrates an exemplary block diagram of a non-volatile memory system with a non-volatile memory, a storage device, and a controller, in accordance with an embodiment of the disclosure;

FIG. 1B illustrates an exemplary block diagram of a storage module with a storage system that has a plurality of storage devices, in accordance with an embodiment of the disclosure;

FIG. 1C illustrates an exemplary block diagram of a hierarchical storage system, in accordance with an embodiment of the disclosure;

DETAILED DESCRIPTION

Figure 2:
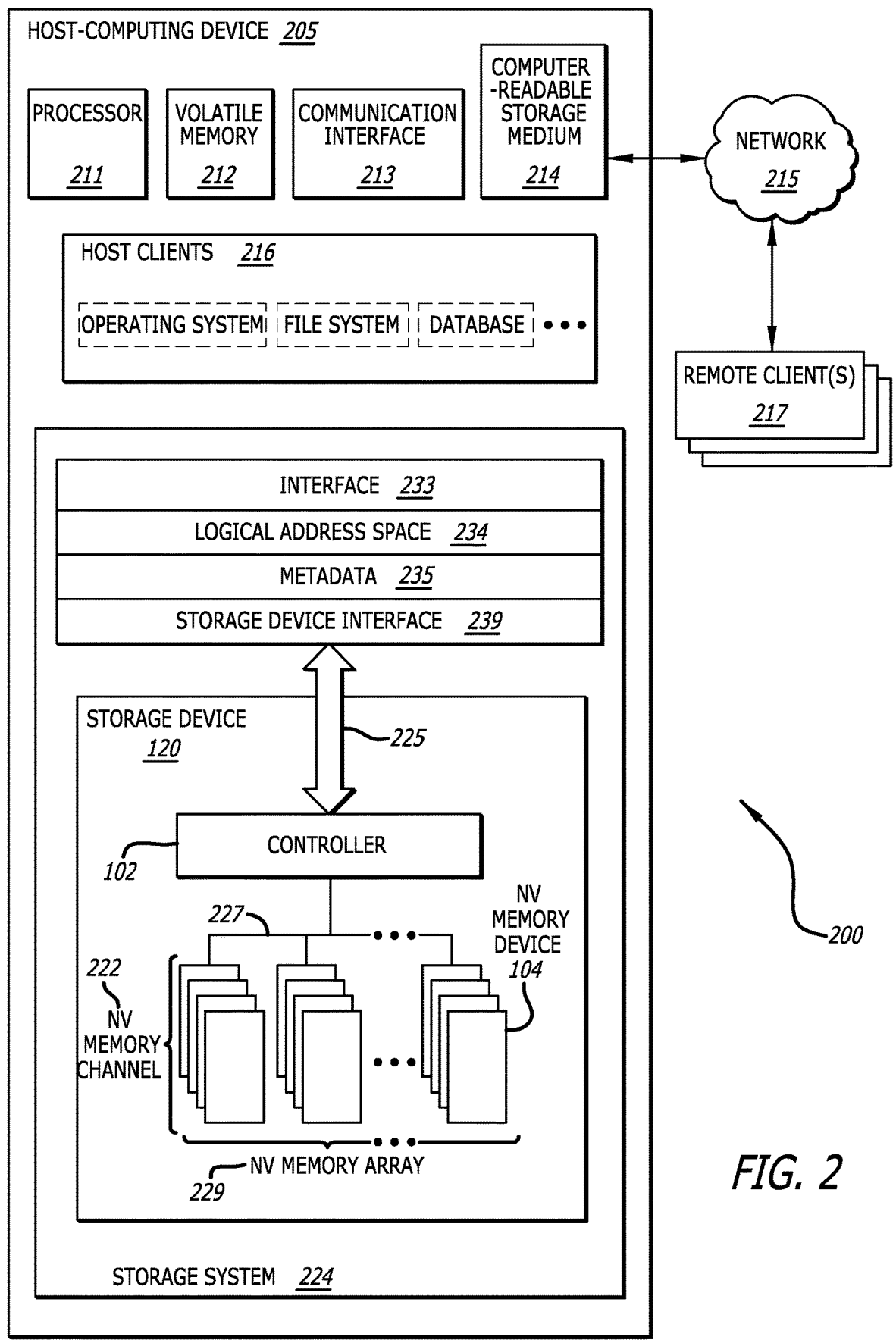
FIG. 2 illustrates a schematic block diagram of a system with a host-computing device configured for mixed mode block cycling, in accordance with an embodiment of the disclosure.

In response to the problems described above, devices and methods are discussed herein that describe optimizing and managing data blocks in a mixed mode in which a SLC is used for storing intermediate data, such as parity data. Additionally, as described in greater detail below, embodiments can include an even-distributing or "leveling" data block cycling process. It is envisioned that this process can place a data block in a higher-density memory mode (such as, by way of non-limiting example, a MLC mode, a TLC mode, a QLC mode, and/or any higher-density memory mode having two or more number of bits per cell) if the corresponding SLC cycle count of the data block is relatively higher as compared to the other data blocks. Similarly, the data block may be placed in an SLC mode to store parity data or any other intermediate data if the corresponding TLC cycle count is relatively higher as compared to the other data blocks.

Also, although the MLC data blocks or TLC data blocks are described and shown below, it will be appreciated that any blocks, including MLC data blocks, TLC data blocks, QLC data blocks, and so on, may be used in various combination without limitation. For example, the mixed mode described herein may be configured with the SLC mode in combination with any higher-density memory modes including, but not limited to, (i) SLC and MLC modes, (ii) SLC and TLC modes, (iii) SLC and QLC modes, and so on. It will be appreciated that mixed modes may be implemented using the SLC mode in combination with any higher-density memory mode capable of storing two or more number of bits per cell, without limitation. Thus, as described herein, a mixed mode may be configured to utilize SLC and MLC modes, SLC and TLC modes, SLC and QLC modes, and so on in any combination, without limitation.

In instances where a pair of SLC data blocks are available in mixed mode, they may be used in the MLC memory mode to balance the SLC program/erase (P/E) cycles. The same approach may be utilized in subsequent cycles to maintain the balance between all the SLC P/E cycles and the MLC P/E cycles in the mixed mode. It is envisioned that as the SLC usage count of a particular data block escalates over a maximum allowed value or threshold, the data block is no longer operated in a SLC mode, resulting in the data block operating in a TLC mode, for example.

Such embodiments ensure that after using the data blocks in mixed mode for a long period of time, the P/E cycles for the SLC and MLC remain balanced and evenly distributed across the data blocks. Embodiments of the mixed mode also enable storage devices to have reduced parity footprint, reduced overall SLC data block budget requirements, and improved overall yield. In additional embodiments, if all the word lines need protection in the mixed mode, then the usage of the mixed mode becomes extremely efficient as the requirement of using the SLC data blocks in the SLC mode proportionately increases. Alternatively, the saved SLC data blocks can be used for SLC cache for host data to improve the burst performance of the corresponding storage device by increasing the SLC cache.

In some embodiments, as shown below in FIGS. 3A-3B, the mixed mode may be implemented as a mixed mode component (or mixed mode scheme, element, module, etc.) in one or more non-volatile memory devices to facilitate those devices with increased performance, full capacity, and reduced data footprint. For example, the mixed mode component described herein enables such devices to: use the mixed mode even if the capacity of such devices is full, the SLC mode for intermediate data (e.g., parity data), and eventually overcome the performance pitfalls and capacity limitations typically associated with such devices, as generally described in the present disclosure. It will be appreciated that the mixed mode component is configured to optimize the usage of all SLC data blocks and MLC data blocks used in the mixed mode.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Examples of suitable non-volatile memory arrangements in which the systems and methods disclosed herein may be used are illustrated in FIGS. 1A-1C. That is, the following embodiments disclose non-volatile memory systems and devices and related methods for mixed mode block cycling of intermediate data (e.g., parity data). Before turning to these and other embodiments, the following paragraphs provide some exemplary non-volatile memory systems, storage devices, and storage modules that can be used with such embodiments. It will be appreciated that any other suitable embodiments of non-volatile memory systems, devices, and/or storage modules may be used alone or in combination therewith, without limitation.

Referring now to FIG. 1A, an exemplary block diagram of a non-volatile memory system 100 is shown, in accordance with some embodiments. The non-volatile memory system 100 includes a storage device 120 (or a non-volatile storage device) with a controller 102 and a non-volatile memory that may be comprised of one or more non-volatile memory device 104 (also referred to as memory, memory dies, and so on). As described herein, the term die refers to the set of non-volatile memory cells—and associated circuitry (or logic) for managing the physical operation of those non-volatile memory cells—that are formed on a single semiconductor substrate. In some embodiments, the non-volatile memory system 100 may also include a mixed mode block cycling module (or a mixed mode module) that may be implemented in the controller 102 of the storage device 120 (e.g., as shown in the mixed mode block cycling module 334 in FIG. 3A).

As described herein, the "mixed mode block cycling module" may refer to a component operating non-volatile memory data blocks in a "mixed mode"—and associated circuitry for managing the physical operation(s) of those non-volatile memory data blocks—in which such component is capable of operating (e.g., programming, reading, erasing, tracking, allocating, balancing, evenly cycling, etc.) some memory data blocks (or blocks, cells, etc.) in both an SLC mode and a higher-density memory mode (e.g., any combination of a 3-bit "TLC" mode, a 4-bit "QLC" mode, and so on), wherein such blocks are particularly capable of being used for intermediate data such as parity data and/or any other type of intermediate data. In some embodiments, the mixed mode module may be part of and/or in communication with the controller 102, the non-volatile memory device 104, a device driver, or the like. In some embodiments, the mixed mode module may operate in a non-volatile memory system or storage device of a computing device (e.g., as shown for reference in FIGS. 2 and 3A-3B).

In an embodiment, the controller 102 interfaces with a host 112 and transmits command sequences for read, program, and erase operations to the non-volatile memory device 104. In an embodiment, the controller 102 may take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 may be configured with various hardware and/or firmware to perform the various functions described below and shown in the flow diagrams. Also, some of the components shown as being internal or external to the controller 102 can be respectively stored external or internal to the controller, and other components can be used. Additionally, the phrase "operatively in communication with" could mean directly in communication with or indirectly (wired or wireless) in communication with through one or more components, which may or may not be shown or described herein.

In some embodiments, the controller 102 may be a flash memory controller or the like. As described herein, a flash memory controller may be a device that manages data stored on flash memory and communicates with a host 112, such as a computer or electronic device. A flash memory controller can have functionality in addition to the specific functionality described herein. For example, the flash memory controller can format the flash memory to ensure the memory is operating properly, map out bad flash memory data blocks (or cells), and allocate spare data blocks to be substituted for future failed cells. Some part of the spare data blocks can be used to hold firmware to operate the flash memory controller and implement other features. In operation, when a host 112 needs to read data from or write data to the flash memory, it will communicate with the flash memory controller. If the host 112 provides a logical address to which data is to be read/written, the flash memory controller can convert the logical address received from the host 112 to a physical address in the flash memory. Note that, alternatively, the host 112 may provide the physical address. The flash memory controller can also perform various memory management functions, such as, but not limited to, wear leveling (i.e., distributing writes to avoid wearing out specific blocks of memory that would otherwise be repeatedly written to), garbage collection (i.e., after a block is full, moving only the valid pages of data to a new block, so the full block can be erased and reused), and/or any other similar memory management functions.

In some embodiments, the non-volatile memory device 104 may include any suitable storage device, medium, or element, including NAND flash memory cells and/or NOR flash memory cells. The memory cells can take the form of solid-state (e.g., flash) memory cells and can be one-time programmable, few-time programmable, or many-time programmable. Additionally, as noted above, the memory cells can also be SLCs, MLCs, TLCs, QLCs, or use any other memory technologies, now known or later developed. Also, the memory cells can be arranged in a two-dimensional or three-dimensional fashion.

The interface between the controller 102 and the non-volatile memory device 104 may be any suitable flash interface, such as a double data rate (DDR) interface or the like. In one embodiment, the non-volatile memory system 100 may be a card-based system, such as a secure digital (SD) or a micro secure digital (micro-SD) card. In an alternate embodiment, the non-volatile memory system 100 may be part of an embedded memory system.

Additionally, it should be noted that as shown in FIG. 1A, the non-volatile memory system 100 includes a single channel between the controller 102 and the non-volatile memory device 104. Although the illustrated embodiment shows a single-memory channel, any number of channels may be utilized without exceeding beyond the spirit and scope of the present disclosure. For example, in some NAND memory system architectures, 2, 4, 8 or more NAND channels may exist between the controller 102 and the NAND memory device(s) based on the controller capabilities. As such, in any of the other embodiments described herein, a single channel and/or two or more channels may exist between the controller and the memory die(s), even if a single channel is shown in the drawings.

Referring now to FIG. 1B, an exemplary block diagram of a storage module 201 is shown, in accordance with some embodiments. The storage module 201 includes a storage system 204 having a plurality of storage devices 120, in accordance with some embodiments. As such, the storage module 201 may include one or more non-volatile memory systems similar to the non-volatile memory system 100 in FIG. 1A. In an embodiment, the storage module 201 may include a storage controller 202 that interfaces with a host 112 and the storage system 204, which includes the non-volatile memory systems comprised of the storage devices 120, the memory devices 104, and the controllers 102. The interface between storage controller 202 and the non-volatile memory systems (or the storage devices 120) may be a bus interface, such as a serial advanced technology attachment (SATA) or peripheral component interface express (PCIe) interface. In some embodiments, the storage module 201 may be a solid-state drive (SSD), as found in portable computing devices, such as laptop computers, and tablet computers.

Referring now to FIG. 1C, an exemplary block diagram of a hierarchical storage system 210 is shown, in accordance with some embodiments. In an embodiment, the hierarchical storage system 210 may include a plurality of storage controllers 202, each of which control a respective storage system 204. Additionally, the hierarchical storage system 210 may be communicatively coupled to one or more hosts 112 that may access memories within the hierarchical storage system 210 via a bus interface (or the like). In one embodiment, the bus interface may be a non-volatile memory express (NVMe), a fiber channel over Ethernet (FCoE) interface, or the like. In one embodiment, the hierarchical storage system 210 illustrated in FIG. 1C may be a rack mountable mass storage system that is accessible by multiple hosts 112, as would be found in a data center or other locations where mass storage is needed.

FIG. 2 illustrates a schematic block diagram of a computing system 200 with a host-computing device 205 that includes a storage device 120 suitable for mixed mode block cycling operations, in accordance with some embodiments. The computing system 200 may include one or more storage devices 120 in a storage system 224 that is configured with a host-computing device 205 in communication with a controller 102. The host-computing device 205 may include a processor 211, a volatile memory 212, and a communication interface 213. The processor 211 may include one or more central processing units, one or more general-purpose processors, one or more application-specific processors, one or more virtual processors (e.g., the host-computing device 205 may be a virtual machine operating within a host), one or more processor cores, or the like. The communication interface 213 may include one or more network interfaces configured to communicatively couple the host-computing device 205 and/or controller 226 of the storage device 120 to a network 215 (or a communication network), such as an Internet Protocol (IP) network, a Storage Area Network (SAN), a wireless or wired network, or the like.

In some embodiments, the storage device 120 may be disposed in one or more different locations relative to the host-computing device 205. In one embodiment, the storage device 120 comprises one or more non-volatile memory devices (or dies) 104, such as semiconductor devices and/or any other similarly integrated circuit devices disposed on one or more PCBs, storage housings, and/or other mechanical and/or electrical support structures. For example, the storage device 120 may include one or more direct inline memory module (DIMM) cards, one or more expansion cards and/or daughter cards, a SSD or other hard drive device, and/or may have another memory and/or storage form factor. The storage device 120 may be integrated with and/or mounted on a motherboard of the host-computing device 205, installed in a port and/or slot of the host-computing device 205, installed on a different host-computing device 205 and/or a dedicated storage appliance on the network 215, in communication with the host-computing device 205 over an external bus (e.g., an external hard drive or the like), or the like.

In additional embodiments, the storage device 120 may be disposed on a memory bus of a processor 211 (e.g., on the same memory bus as the volatile memory 212, on a different memory bus from the volatile memory 212, in place of the volatile memory 212, or the like). In a further embodiment, the storage device 120 may be disposed on a peripheral bus of the host-computing device 205, such as a peripheral component interconnect express (PCI Express or PCIe) bus such as, but not limited to, a NVMe interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a network 215, such as an Ethernet network, an Infiniband network, SCSI RDMA over a network, a storage area network (SAN), a local area network (LAN), a wide area network (WAN) such as the Internet, another wired and/or wireless network, or the like.

The host-computing device 205 may further comprise computer-readable storage medium 214. The computer-readable storage medium 214 may comprise executable instructions configured to cause the host-computing device 205 (e.g., processor 211) to perform steps of one or more of the methods disclosed herein. Additionally, or in the alternative, the buffering component 250 may be embodied as one or more computer-readable instructions stored on the computer-readable storage medium 214.

For some embodiments, the controller 102 and/or a device driver may present a logical address space 234 to the host clients 216. As used herein, a logical address space 234 refers to a logical representation of memory resources. The logical address space 234 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The controller 102 (or the driver) of the storage device 120 (or may maintain metadata 235, such as a logical to physical address mapping structure, to map logical addresses of the logical address space 234 to media storage locations on the storage device(s) 120. The controller 102 may be configured to provide storage services to one or more host clients 216. The host clients 216 may include local clients operating on the host-computing device 205 and/or remote clients 217 (or remote host clients) accessible via the network 215 and/or communication interface 213. The host clients 216 may include, but are not limited to: operating systems, file systems, database applications, server applications, kernel-level processes, user-level processes, applications, and the like.

The controller 102 may be further communicatively coupled to one or more storage systems 224 that may include different types and configurations of storage devices 120 such as, but not limited to, solid-state storage devices, semiconductor storage devices, SAN storage resources, or the like. The one or more storage devices 120 may comprise one or more respective controllers 102 and non-volatile memory channels 222. The device driver may provide access to the one or more storage devices 120 via any compatible protocols or interface 233 such as, but not limited to, SATA and PCIe. The metadata 235 may be used to manage and/or track data operations performed through the protocols or interfaces 233. The logical address space 234 may comprise a plurality of logical addresses, each corresponding to respective media locations of the one or more storage devices 120. The controller 102 may maintain metadata 235 comprising any-to-any mappings between logical addresses and media locations.

The controller 102 may further comprise and/or be in communication with a storage device interface 239 configured to transfer data, commands, and/or queries to the one or more storage devices 120 over a bus 225, which may include, but is not limited to, a memory bus of a processor 211, a PCI Express or PCIe bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 215, Infiniband, SCSI RDMA, or the like. The storage device interface 239 may communicate with the one or more storage devices 120 using input-output control (IO-CTL) command(s), IO-CTL command extension(s), remote direct memory access, or the like.

The communication interface 213 may comprise one or more network interfaces configured to communicatively couple the host-computing device 205 and/or the controller 102 to a network 215 and/or to one or more remote clients 217. The controller 102 may be part of and/or in communication with the one or more storage devices 120. Also, although FIG. 2 illustrates a single storage device 120, the computing system 200 and/or the storage system 224 are not limited in this regard and could be adapted to incorporate any number of storage devices 120.

The storage device 120 may comprise one or more non-volatile memory devices 104 of non-volatile memory channels 222, which may include, but is not limited to, ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silico-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 104 of the non-volatile memory channels 222, in certain embodiments, may comprise storage class memory (SCM) (e.g., write in place memory, or the like).

While the non-volatile memory channels 222 may be referred to as "memory media" in various embodiments, the non-volatile memory channels 222 may more generally comprise one or more non-volatile recording media capable of recording data that may be referred to as a non-volatile memory medium, a non-volatile storage medium, or the like. Further, the storage device 120, in various embodiments, may comprise a non-volatile recording device, a non-volatile memory array, a plurality of interconnected storage devices in an array, or the like.

The non-volatile memory channels 222 may comprise one or more non-volatile memory devices 104, which may include, but are not limited to, chips, packages, planes, die, or the like. The controller 102 may be configured to manage data operations on the non-volatile memory channels 222, and may comprise one or more processors, programmable processors (e.g., FPGAs), ASICs, micro-controllers, or the like. In some embodiments, the controller 102 may be configured to store data on and/or read data from the non-volatile memory channels 222, to transfer data to/from the storage device 120, and so on.

The controller 102 may be communicatively coupled to the non-volatile memory channels 222 by way of a bus 227. The bus 227 may comprise an I/O bus for communicating data to/from the non-volatile memory devices 104. The bus 227 may further comprise a control bus for communicating addressing and other command and control information to the non-volatile memory devices 104. In some embodiments, the bus 227 may communicatively couple the non-volatile memory devices 104 to the controller 102 in parallel. This parallel access may allow the non-volatile memory devices 104 to be managed as a group, forming a non-volatile memory array 229. The non-volatile memory devices 104 may be partitioned into their respective logical memory units (e.g., logical pages) and/or logical memory divisions (e.g., logical blocks and logical planes). The logical memory units may be formed by logically combining physical memory units of each of the non-volatile memory devices 104.

The controller 102 may organize a block of word lines within a non-volatile memory device 104, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 102 may compromise and/or be in communication with a device driver that is being executed on the host-computing device 205. For example, the controller 102 and/or such device driver may provide storage services to the host clients 216 via one or more interfaces 233. Likewise, the controller 102 and/or such device driver may further comprise a storage device interface 239 that is configured to transfer data, commands, and/or queries to the controller 102 over a bus 225, as described above.

Figure 3A:
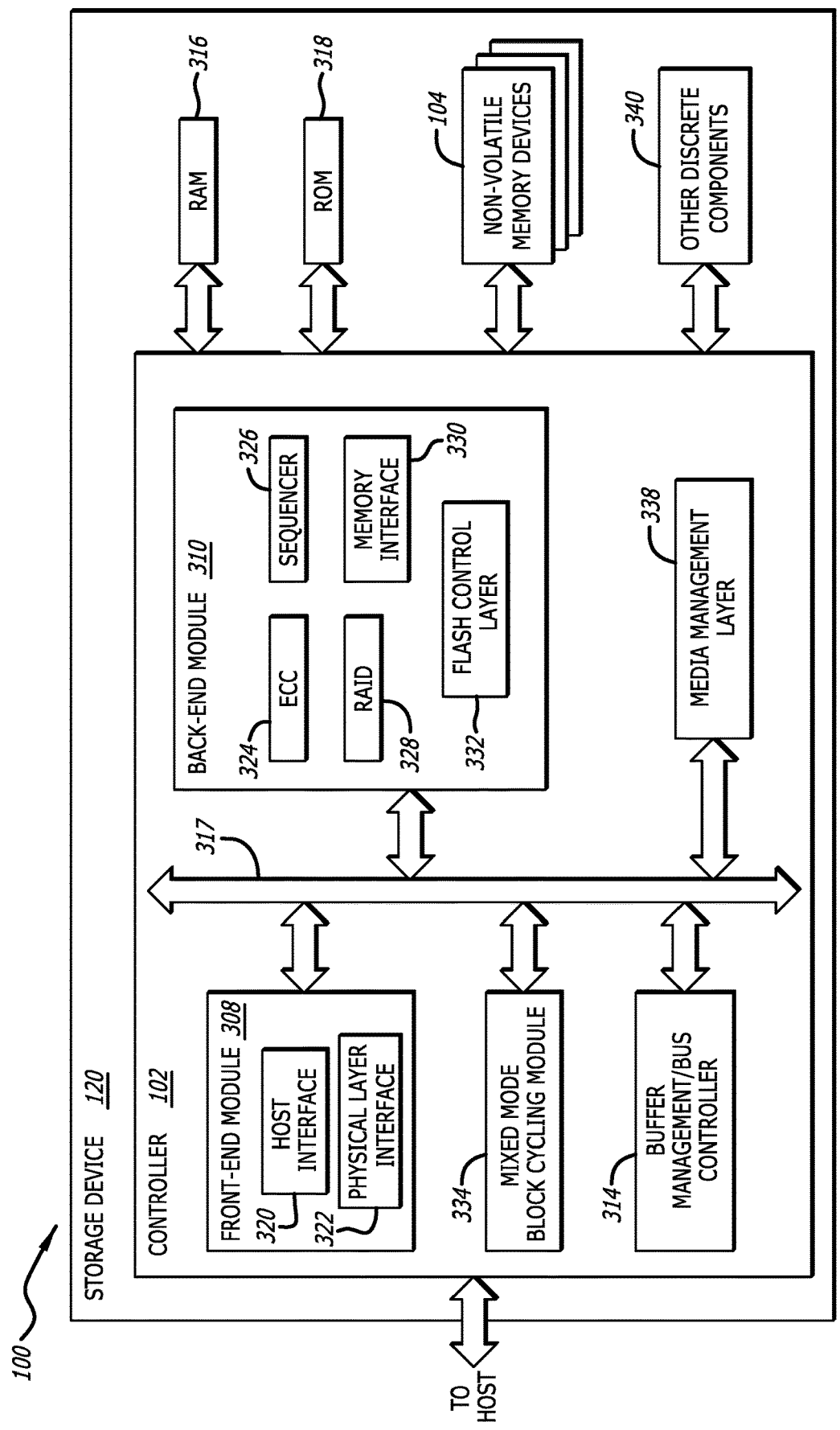
FIG. 3A illustrates a schematic block diagram of an embodiment of a controller of a storage device configured for mixed mode block cycling, in accordance with an embodiment of the disclosure.

Referring now to FIG. 3A, a schematic block diagram illustrates exemplary components of the storage device 120 in greater detail, according to some embodiments. The controller 102 may include a front-end module 308 that interfaces with a host, a back-end module 310 that interfaces with the non-volatile memory device(s) (or die(s)) 104, and various other modules that perform various functions of the non-volatile memory system 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition, or alternatively, each module may include memory hardware that comprises instructions executable with a processor or processor circuitry to implement one or more of the features of the module. When any of the one or more modules includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer management/bus controller module 314 that manages buffers in random access memory (RAM) 316 and controls the internal bus arbitration for communication on an internal communications bus 317 of the controller 102. A read only memory (ROM) 318 may store and/or access system boot code. Also, although both the RAM 316 and ROM 318 in FIG. 3A are illustrated as located separately from the controller 102, the RAM 316 and/or the ROM 318 may be located within the controller 102 in other embodiments. In yet another embodiment, portions of the RAM 316 and/or the ROM 318 may be located both within the controller 102 and outside the controller 102. Further, in some implementations, the controller 102, the RAM 316, and the ROM 318 may be located on separate semiconductor devices (or dies).

Additionally, the front-end module 308 may include a host interface 320 and a physical layer interface 322 that provide the electrical interface with the host or next level storage controller. The choice of the type of the host interface 320 can depend on the type of memory being used. Examples types of the host interface 320 may include, but are not limited to, SATA, SATA Express, SAS, Fibre Channel, USB, PCIe, and NVMe. The host interface 320 may typically facilitate transfer for data, control signals, and timing signals.

The back-end module 310 may include an error correction controller (ECC) engine 324 that encodes the data bytes received from the host and decodes and error corrects the data bytes read from the non-volatile memory device(s) 104. As discussed below, the ECC engine 324 may be tunable, such as to generate varying amounts of ECC data based on the mode (e.g., generate normal mode ECC data in normal programming mode and generate mixed mode ECC data in mixed mode programming mode, with the mixed mode ECC data being greater than the normal mode ECC data). The back-end module 310 may also include a command sequencer 326 that generates command sequences, such as program, read, and erase command sequences, to be transmitted to the non-volatile memory device(s) 104. Additionally, the back-end module 310 may include a RAID (Redundant Array of Independent Drives) module 128 that manages generation of RAID parity and recovery of failed data. The RAID parity may be used as an additional level of integrity protection for the data being written into the non-volatile memory system 100. In some cases, the RAID module 328 may be a part of the ECC engine 324. A memory interface 330 provides the command sequences to the non-volatile memory device(s) 104 and receives status information from the non-volatile memory device(s) 104. Along with the command sequences and status information, data to be programmed into and read from the non-volatile memory device(s) 104 may be communicated through the memory interface 130. In one embodiment, the memory interface 330 may be a double data rate (DDR) interface. A flash control layer 332 may control the overall operation of the back-end module 310.

Additional modules of the non-volatile memory system 100 illustrated in FIG. 2A may include a media management layer 338, which performs wear leveling of memory cells of the non-volatile memory device 104. The non-volatile memory system 100 may also include other discrete components 340, such as external electrical interfaces, external RAM, resistors, capacitors, or other components that may interface with controller 102. In alternative embodiments, one or more of the RAID modules 328, media management layer 338, and the buffer management/bus controller 314 are optional components that may not be necessary in the controller 102.

Additionally, in some embodiments, the controller 102 may include the mixed mode block cycling module 334 as described above. The mixed mode block cycling module 334 may be configured to manage and operate some intermediate data placed in the non-volatile memory devices 104 such as parity data or the like. In these embodiments, the mixed mode block cycling module 334 may operate such parity data in a mixed mode comprised of a SLC mode in combination with any higher-density memory mode, including by way of non-limiting example, an MLC mode, a TLC mode, or a QLC mode, alone and/or in any combination.

Furthermore, in some embodiments, one or more modules of the non-volatile memory system 100 illustrated in FIG. 1A may also include the mixed mode block cycling module 334 and/or portions of the mixed mode block cycling module 334. As such, these modules are shown as separate from the other modules of the non-volatile memory system 100, although in other configurations, one or more of those mixed mode modules may be part of any of the other modules.

Figure 3B:
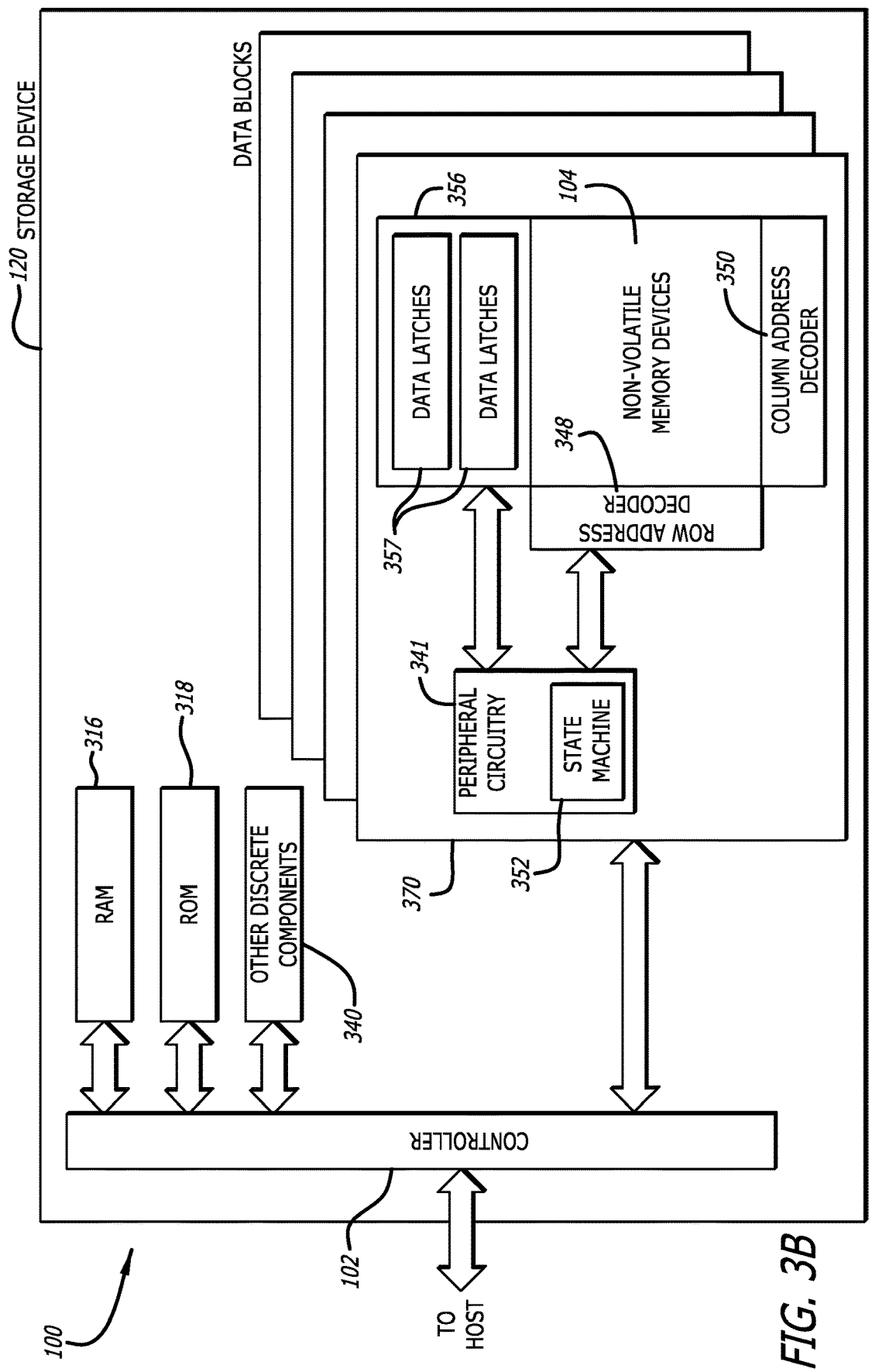
FIG. 3B illustrates a schematic block diagram of an embodiment of a non-volatile memory device of a storage device configured for mixed mode block cycling, in accordance with an embodiment of the disclosure.

Referring to FIG. 3B, a schematic block diagram illustrates exemplary components of the storage device 120 in greater detail, according to some embodiments. The plurality of data blocks 370 may include a one or more non-volatile memory devices 104 each configured to store one or more bits of data. The non-volatile memory devices 104 may be any suitable non-volatile memory cells, including NAND flash memory cells and/or NOR flash memory cells in a two-dimensional configuration and/or a three-dimensional configuration. The memory devices 104 may take the form of solid-state (e.g., flash) memory cells and can be one-time programmable, few-time programmable, or many-time programmable. In addition, as described above, the memory elements, data blocks, or cells may be configured as SLCs that store a single bit of data per cell, multi-level cells MLCs that store multiple bits of data per cell, or combinations thereof. For example, the MLCs may include TLCs, QLCs, and so on, that store three, four, and more than four bits of data per cell, without limitation.

Additionally, a flash memory device 104 may include a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell.

For example, the SLCs and the TLCs/QLCs may be disposed in the non-volatile memory array 342 in accordance with a matrix-like structure of rows and columns of memory cells. At the intersection of a row and a column is an FGT (or memory devices 104). A column of memory devices 104 may be referred to as a string. Memory devices 104 in a string or column may be electrically connected in series, whereas, a row of memory devices 104 may be referred to as a page. Control gates of memory devices 104 in a page or row may be electrically connected or otherwise coupled without limitation.

The non-volatile memory array 342 may also include word lines and bit lines connected to each memory device 104. Each page of memory devices 104 is coupled to a word line. In particular, each word line may be coupled to the control gates of memory devices 104 in a page. In addition, each string of memory devices 104 may be coupled to a bit line. Further, a single string may span across multiple word lines, and the number of memory devices 104 in a string may be equal to the number of pages in a data block 370.

In some embodiments, the non-volatile memory devices 104 may be communicatively connected to a peripheral circuitry 341 with a state machine 352 that provides status information to controller 102. The non-volatile memory device 104 may further be in communication with a data cache 356 that caches data. The non-volatile memory device 104 may also be connected to or otherwise in communication with a row address decoder 348 and a column address decoder 350. The row address decoder 348 may decode a row address and select a particular word line from the non-volatile memory devices 104 during reading or writing data. The column address decoder 350 may decode a column address to select a particular group of bit lines from the non-volatile memory devices 104 to be electrically coupled to the data cache 344.

The data cache 356 may include sets of data latches 357 for each bit of data in a memory page of non-volatile memory devices 104. Thus, each set of data latches 357 may be a page in width, and a plurality of sets of data latches 357 may be included in the data cache 356. Additionally, in other embodiments, the controller 102 may be implemented in as a single integrated circuit chip and may communicate with the one or more different layers of memory within the data block 370 over one or more command channels. Note that, in other embodiments, controller executable code for implementing memory management instructions as described herein may be stored in the non-volatile flash memory.

As described herein, the non-volatile memory devices 104 may be arranged in data blocks 370 in which one block (or grouping) of memory devices 104 is the unit of erase, i.e., the smallest number of memory cells that are physically erasable together. For increased parallelism, however, the blocks may be operated in larger metablock (MB) units. One block from each of at least two planes of memory cells may be logically linked together to form a metablock.

Figure 4A:
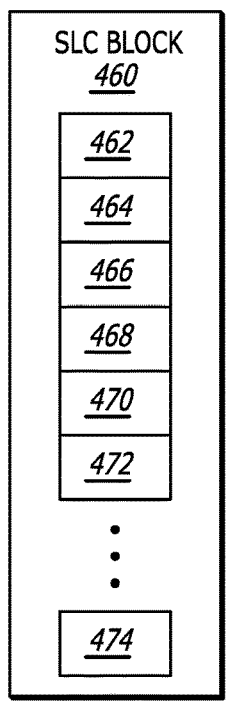
FIG. 4A illustrates a schematic block diagram of a SLC data block, in accordance with an embodiment of the disclosure.

Referring now to FIG. 4A, a simplified block diagram illustration of one embodiment of a SLC data block 460 is shown, in accordance with some embodiments. In the illustrated embodiment, the SLC data block 460 may include a first word line 462, a second word line 464, a third word line 466, a fourth word line 468, a fifth word line 470, a sixth word line 472, and an nth word line 474. As may be appreciated, any number of word lines may be between the sixth word line 472 and the nth word line 474. Accordingly, the SLC data block 460 may have any suitable number of word lines. In one embodiment, the SLC data block 460 includes 16 word lines, 32 word lines, 64 word lines, 128 word lines, 256 word lines, and so forth. In various embodiments, each word line may correspond to a number of strings, such as 1, 2, 4, 8, 16, and so forth. For example, in one embodiment, the SLC data block 460 includes 64 word lines, with each word line corresponding to 4 strings for a total of 256 pages (e.g., 64 word lines×4 strings=256 pages). In some embodiments, the first word line 462, the second word line 464, the third word line 466, and the fourth word line 468 may not be used to store data. In such embodiments, the SLC data block 460 is used in a shifted manner to inhibit memory errors. Therefore, in such embodiments, if the SLC data block 260 includes 64 total word lines with each word line corresponding to 4 strings, a total of 240 pages are available for storing data (e.g., 60 word lines×4 strings=240 pages).

Figure 4B:
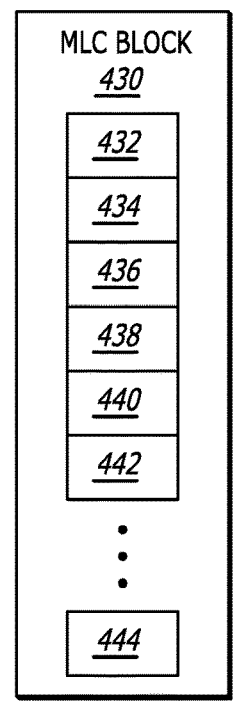
FIG. 4B illustrates a schematic block diagram of a triple-level cell (TLC) data block or a quad-level cell (QLC) data block, in accordance with an embodiment of the disclosure.

Referring now to FIG. 4B, a simplified block diagram illustration of one embodiment of a MLC data block 430 is shown, in accordance with some embodiments. That is, the MLC data block 430 may be one example of either an exemplary MCL block, TLC data block, or QLC data block. As such, although "MLC DATA BLOCK" is shown in FIG. 4B, it will be appreciated that any data blocks with any number of bits per cell may also be used, without limitation. For example, the MLC data block 430 may be configured as, but is not limited to, a MLC data block, a TLC data block, a QLC data block, and so on.

In the illustrated embodiment, the MLC data block 430 includes a first word line 432, a second word line 434, a third word line 436, a fourth word line 438, a fifth word line 440, a sixth word line 442, and an nth word line 444. As may be appreciated, any number of word lines may be between the sixth word line 442 and the nth word line 444. Accordingly, the MLC data block 430 may have any suitable number of word lines. In one embodiment, the MLC data block 430 includes 16 word lines, 32 word lines, 64 word lines, 128 word lines, 256 word lines, and so forth. In various embodiments, each word line may correspond to a number of strings, such as 1, 2, 4, 8, 16, and so forth. For example, in one embodiment, the MLC data block 430 includes 64 word lines, with each word line corresponding to 4 strings for a total of 256 pages (e.g., 64 word lines×4 strings=256 pages). In certain embodiments, all word lines of the MLC data block 430 may be used to store data.

In some embodiments, one-type of data, such as parity data, may be first stored in SLC data blocks (e.g., SLC data block 460). In response to sufficient data being stored in SLC data blocks, the data in the SLC data blocks may be copied to one or more MLC data blocks (e.g., the MLC data block 430). In various embodiments, each MLC data block may be used to store three or more single level cells. Accordingly, in embodiments in which entire SLC data blocks are used to store data, three or more SLC data blocks may be copied into one MLC data block. For example, one SLC data block may be copied into a lower page of the MLC data block, one SLC data block may be copied into a middle page of the MLC data block, and one SLC data block may be copied into an upper page of the MLC data block. Also, in some embodiments, a first data latch (ADL), a second data latch (BDL), and a third data latch (CDL) may hold lower page data, middle page data, and upper page data for one MLC program of the MLC cell block. The data in SLC data blocks may be held there as a temporary backup to a MLC data block into which the data is copied until the MLC cell block passes one or more tests, such as enhanced post write read (EPWR) checks. After the MLC cell block passes the one or more tests, the SLC data blocks may be reused for storing additional data.

Figure 4C:
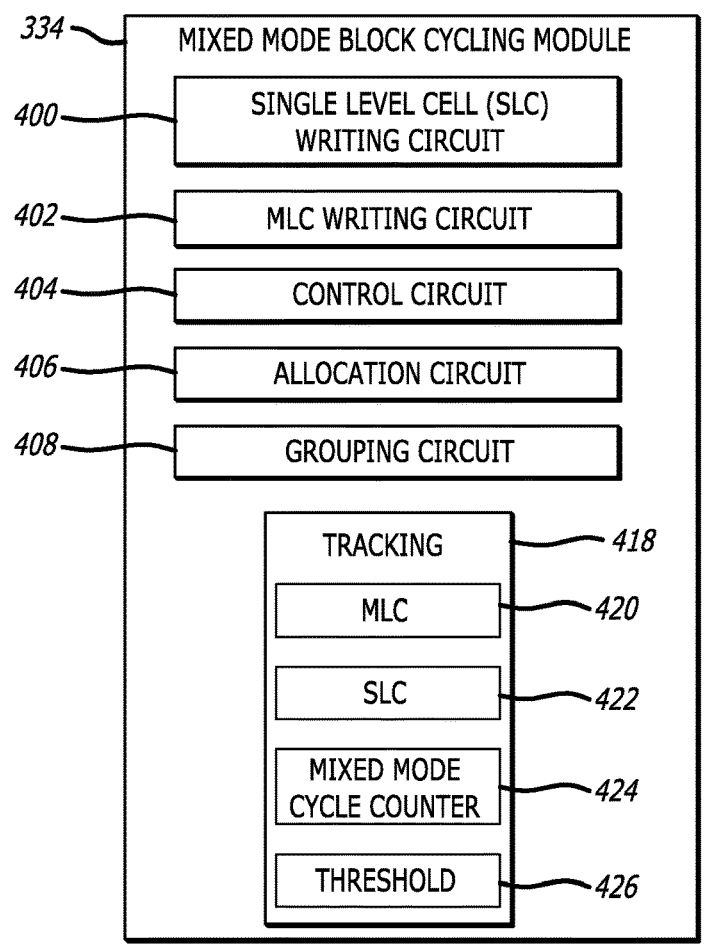
FIG. 4C illustrates a schematic block diagram of an embodiment of a mixed mode block cycling module, in accordance with an embodiment of the disclosure.

Referring now to FIG. 4C, a detailed block diagram illustration of one embodiment of a mixed mode block cycling module 334 is shown, in accordance with some embodiments. The mixed mode block cycling module 334 is substantially similar to the mixed mode block cycling module 334 described above with regard to FIGS. 1A, 2, and 3A-3B. Accordingly, in these embodiments, the illustrated exemplary components of the mixed mode block cycling module 334 may be collectively used to operate one or more SLC and MLC data blocks in the mixed mode as described herein. For example, the mixed mode block cycling module 334 may implement a scheme of mixed mode block cycling, where (i) the SLC and MLC data blocks (e.g., the SLC data block 460 and MLC data block 430 shown above in FIGS. 4A-4B) are evenly cycled in both SLC and MLC modes, and (ii) the blocks in the SLC mode are used for storing and dumping intermediate data (e.g., parity data or the like). Additionally, in some embodiments, the mixed mode block cycling module 334 may be part of and/or in communication with for example, but not limited to, the controller 102, the non-volatile memory devices 104, and the non-volatile memory system 100 shown in FIGS. 1A-1B, 2, and 3A-3B—and/or any other similar non-volatile memory devices, systems, or the like.

As shown in FIG. 4C, the depicted mixed mode block cycling module 334 may include a SLC writing circuit 400, an MLC writing circuit 402, a control circuit 404, an allocation circuit 406, a grouping circuit 408, and a tracking component 418. In these embodiments, the mixed mode block cycling module 334 may use the circuit components 400-408 to write data to the SLC data blocks, to copy the data from the SLC data blocks to the MLC data blocks, to control data that is copied from the SLC data block(s) to the MLC data blocks, to allocate one or more SLC data block(s) in response to one or more MLC data blocks being allocated to the SLC mode, and vice-versa. Additionally, the tracking component 418 can include an MLC cycle tracker 420, a SLC cycle tracker 422, a mixed mode cycle counter 424, and a threshold tracking component 426. For example, the MLC cycle tracker 420 can track (e.g., maintain a count of) physical cycles to mixed mode data blocks in MLC mode (e.g., MLC mode cycles). In a number of embodiments, the MLC mode cycles are MLC data blocks erased and/or programmed.

Similarly, the SLC cycle tracker 422 can track or otherwise maintain a count of physical cycles to mixed mode data blocks in SLC mode (e.g., SLC mode cycles). In a number of embodiments, the SLC mode cycles are SLC data blocks erased and/or programmed. The mixed mode cycle counter 424 can provide a mixed mode cycle count, which can be an effective cycle count or a scaled cycle count having a different value than an actual quantity of physical cycles performed on the mixed mode data blocks. In a number of embodiments, the mixed mode cycles are mixed mode data blocks erased and/or programmed. The actual quantity of physical cycles or the unscaled count is based on the quantity of actual cycles experienced by the mixed mode data blocks (e.g., as determined by MLC cycle tracker 420 and SLC cycle tracker 422). The threshold tracking component 426 may be used to keep SLC usage count of the SLC data blocks that touch or surpass the maximum allowed value set for the SLC usage count in which case the respective SLC data block is no longer used in SLC mode and will then remain in the TLC mode. Although the MLC writing circuit 402 and MLC cycle tracker 420 are shown in FIG. 4C, it will be appreciated that any writing circuits with any number of bits per cell, and any cycle trackers with any number of bits per cell may also be used, without limitation. For example, the MLC writing circuit 402 may be configured as, but is not limited to, a MLC writing circuit, a TLC writing circuit, a QLC writing circuit, and so on. For example, the MLC cycle tracker 420 may be configured as, but is not limited to, a MLC cycle tracker, a TLC cycle tracker, a QLC cycle tracker, and so on.

Figure 5:
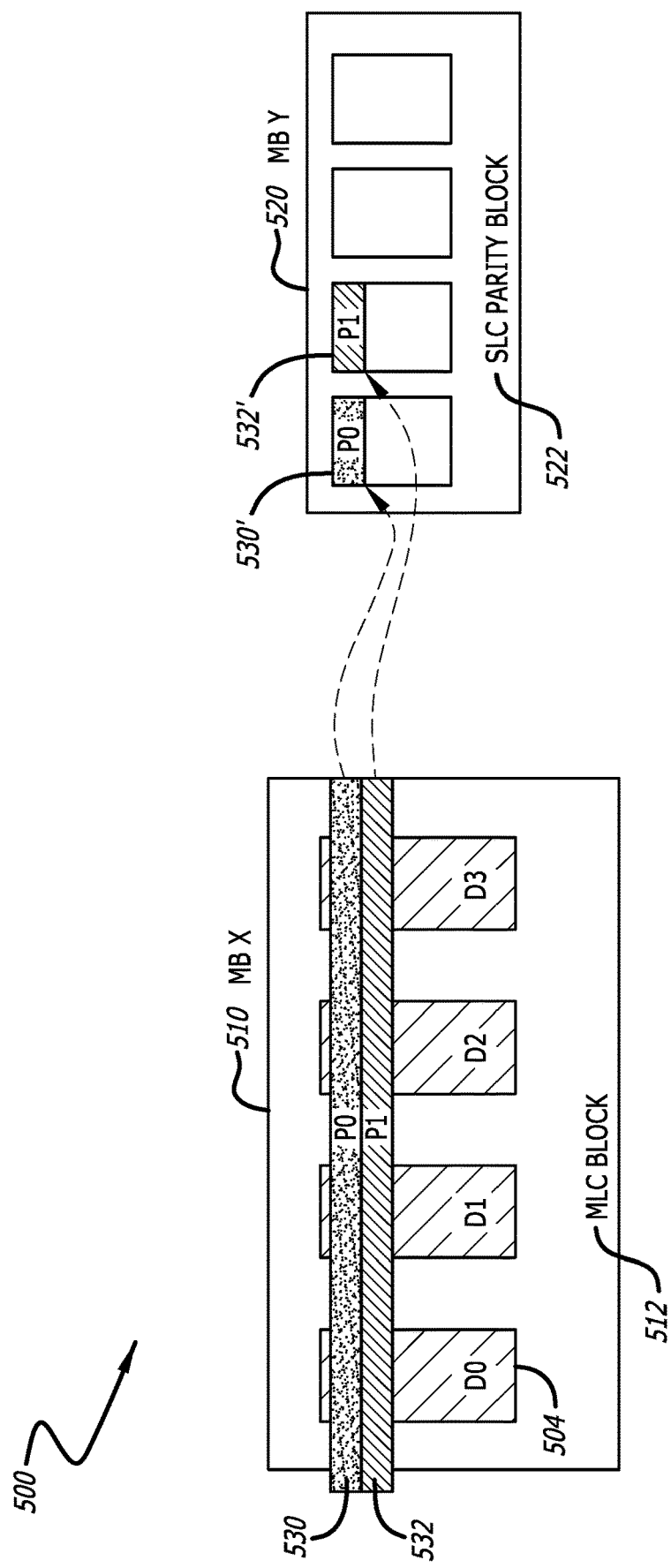
FIG. 5 illustrates an exemplary schematic block diagram of data blocks used to store intermediate data in a mixed mode, in accordance with an embodiment of the disclosure.

FIG. 5 illustrates an exemplary schematic block diagram of a XOR snapshot 500 having metablock 510 ("MB X") and metablock 520 ("MB Y") that are used for parity data (P0-P1) 530/530' and 532/532' in a mixed mode scheme, in accordance with some embodiments. As depicted in FIG. 5, the metablocks 510 and 520 (or blocks) may be implemented using, but not limited to, a XOR snapshot used for intermediate data or the like. Also, although the MLC data block 512 is shown in FIG. 5, it will be appreciated that any data blocks with any number of bits per cell may also be used, without limitation. For example, the MLC data block 512 may be configured as, but is not limited to, a MLC data block, a TLC data block, a QLC data block, and so on.

In general, such XOR snapshot may be used to protect against failures in the MLC data blocks 512 by using a XOR parity scheme that is thus implemented across all the respective storage systems, storage devices, and methods described herein. For example, when a controller has a low RAM footprint, then all the parities are not capable of being cached in RAM, and thus a XOR parity for every metapage (or metablock) is saved in flash continuously as, for example, the illustrated XOR snapshot 500 depicted in FIG. 5. In this instance, the XOR snapshot 500 may be done for write protection for the one or more metablocks 510 and 520, and then, after write is done and verified, the parities such as P0-P1 are released and classified as intermediate data.

It will be appreciated that the illustrated XOR metablock snapshot may be used to operate one or more SLC and MLC data blocks (or TLC data blocks, QLC data blocks, etc.) in the mixed mode described herein. For example, the illustrated XOR snapshot of the metablocks 510 and 520 may be used to implement a scheme of mixed mode block cycling, where the SLC parity block 522 and the MLC data block 512 may be evenly used, allocated, and cycled in the SLC and MLC modes. Additionally, the XOR snapshot of the metablocks 510 and 520 may be used for copying, storing, and erasing the parity data 530 and 532 in the MLC data block 512 to the respective parity data 530' and 532' in the SLC parity block 522, where such parity data 530 and 532 may include any intermediate data shared across the dies 504 (D0-D3) within the metablock 510 that is then stored in the respective parity data 530' and 532' within the metablock 520 that is used in the SLC mode for storing and dumping such intermediate or parity data.

Figure 6:
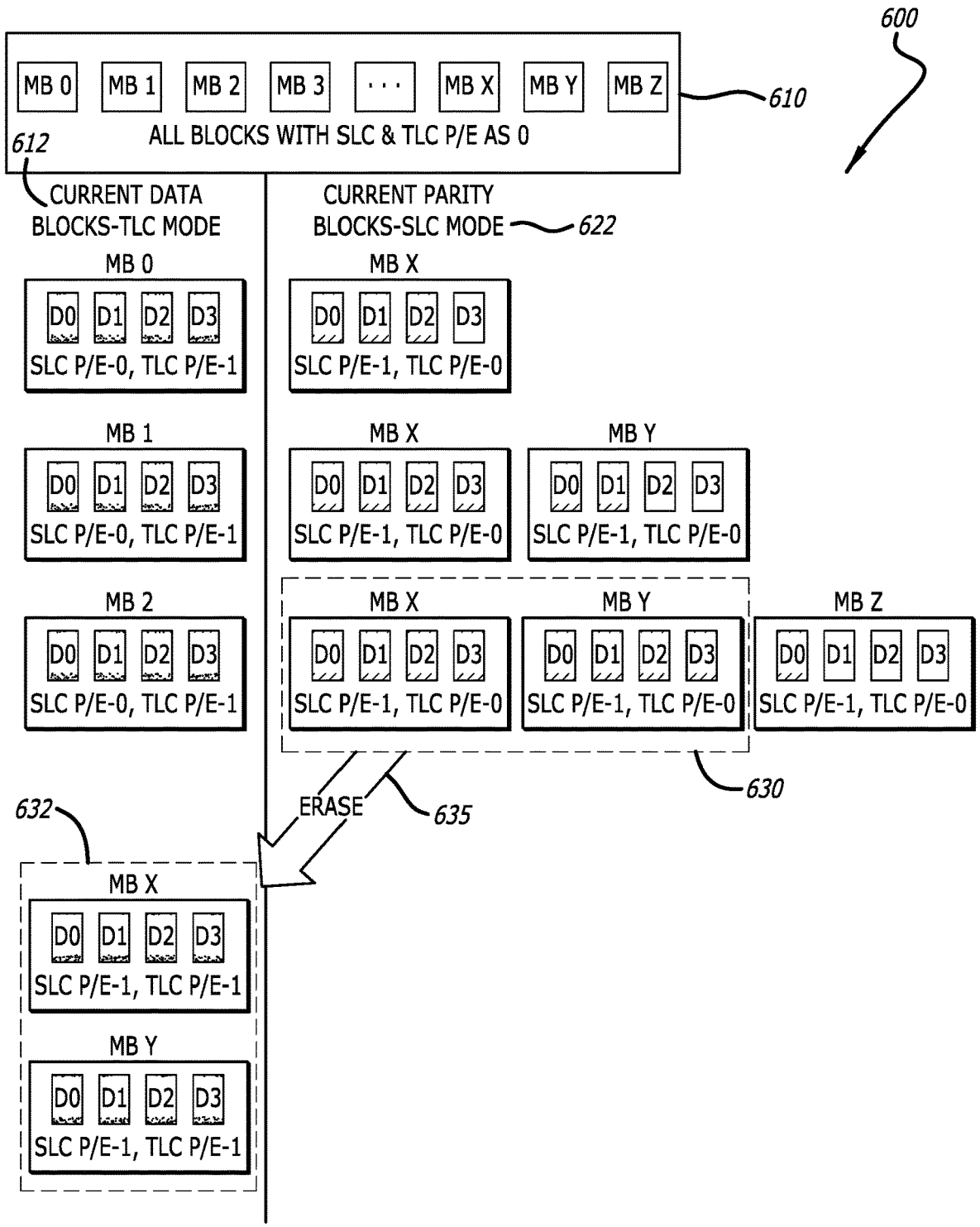
FIG. 6 illustrates an exemplary schematic block diagram for evenly cycling data blocks used to store intermediate data in a mixed mode, in accordance with an embodiment of the disclosure.

FIG. 6 illustrates an exemplary schematic block diagram of an evenly block cycling process 600, according to some embodiments. While the exemplary embodiment of FIG. 6, utilizes TLC mode and data blocks, it should be appreciated that any combination of data blocks, including MLC data blocks, TLC data blocks, and/or QLC data blocks, may be used in various combination without limitation. As described in great detail above, the process 600 may use a plurality of mixed mode data blocks 610 that initially has SLC and TLC data blocks (or SLC and MLC data blocks, SLC and QLC data blocks, etc.) blocks with a "0" for the P/E cycles. Accordingly, the process 600 may allocate and use the TLC mode data blocks 612 in a sub-data block mode and the SLC data blocks 622 for parity data, as shown in FIG. 6. Accordingly, after the blocks ("MB X-Z") are chosen in SLC mode 622, the process 600 then depicts finding a pair of these SLC data blocks that is available for TLC mode, such as the SLC pair of SLC data blocks 630 comprising MB X and MB Y. Thereafter, the process 600 may then allocate the available pair of SLC data blocks 630 for the TLC mode to be erased as shown with the erase arrow 635 and the pair of TLC data blocks 632.

As described above, this process is used to balance the SLC/TLC P/E (program/erase) cycles for the blocks and may use the same approach for subsequent cycles such that the P/E cycles are balanced across the storage device. Also, once the SLC usage count touches the maximum allowed value, then such block(s) is no longer used in SLC mode and will remain in TLC mode. This further ensures that after using the blocks in mixed mode for a long period of time, the P/E cycles for both SLC and TLC remain in balance and evenly distributed across the blocks.

Figure 7:
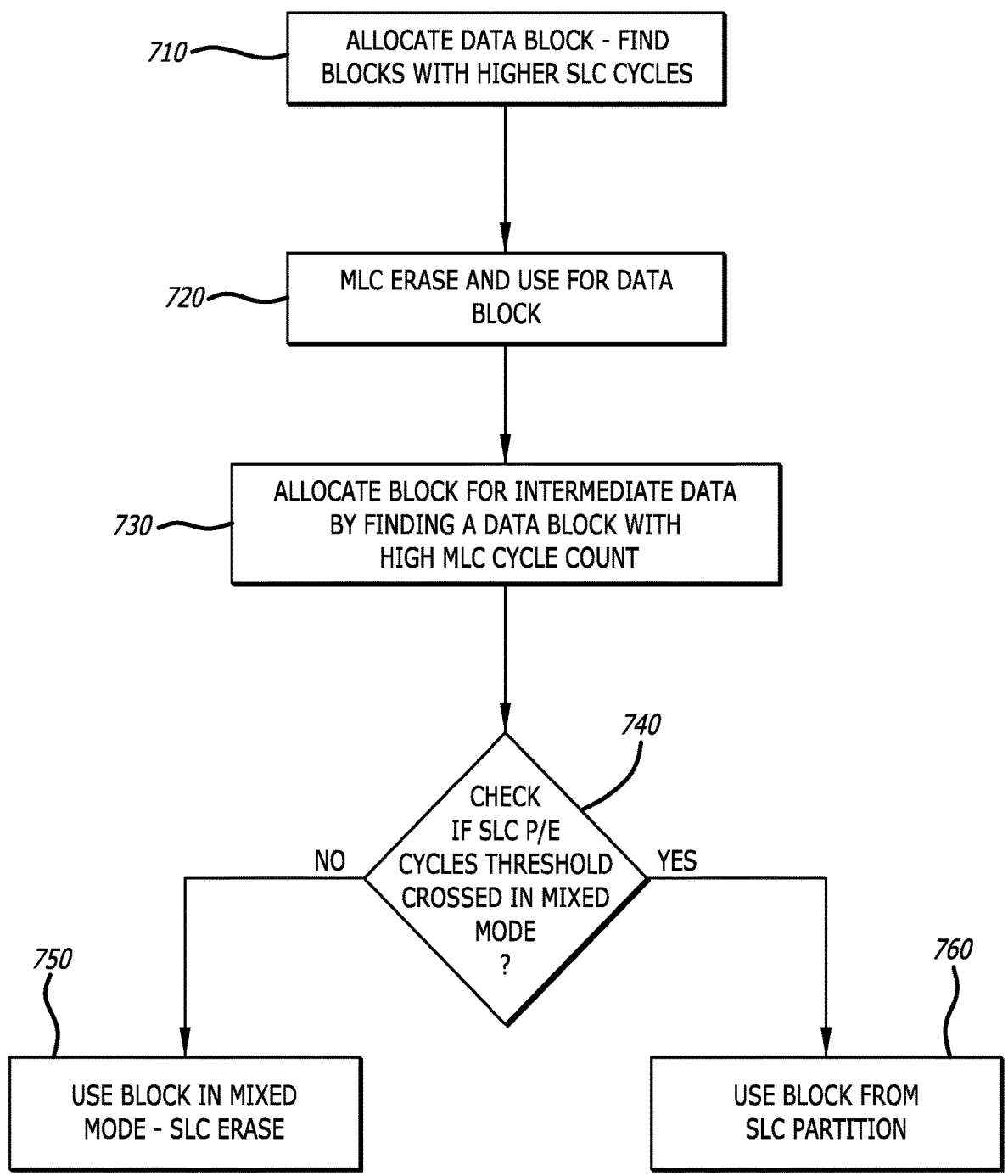
FIG. 7 illustrates a detailed flowchart of an exemplary process for allocating data blocks to store data in a mixed mode and allocating SLC data blocks to store intermediate data in the mixed mode, in accordance with some embodiments.

Referring now to FIG. 7, a high-level flowchart depicting a mixed mode process 700 configured to allocate SLC and MLC data blocks in a mixed mode, in accordance with some embodiments. Although the MLC data blocks are shown in FIG. 7, it will be appreciated that any data blocks, including MLC data blocks, TLC data blocks, and/or QLC data blocks, may be used in various combination without limitation. For example, the mixed mode may be configured as, but is not limited to, SLC and MLC data blocks, SLC and TLC data blocks, SLC and QLC data blocks, and so on. For example, at block 710, the process 700 depicts the allocation of a data block, such as a MLC data block, by finding the block with the highest SLC cycle count as compared to the other blocks. More specifically, at block 720, the storage device (or the like) may erase the selected (or allocated) MLC data block and then proceed to use the erased MLC data block.

Continuing with the illustrated process 700 in FIG. 7, at block 730, the process 700 depicts the allocation of a block, such as a SLC data block, to be used for intermediate data (e.g., parity data) by finding the block with the highest MLC cycle count as compared to the other blocks. Accordingly, at block 740, the process 700 determines whether the selected block (back at block 730) has exceeded a predetermined SLC P/E cycle count threshold value in mixed mode. As a result, at block 750, the process 700 proceeds to use the block in mixed mode for the intermediate data (which may include erasing the SLC data block as a parity dump) at block 750 if the selected block had not crossed the SLC P/E cycles threshold. Alternatively, at block 760, the process 700 would proceed to use a block from an SLC partition if the selected block had crossed the SLC P/E cycles threshold. Note that, although it is contemplated that the embodiments described herein may be applied to any suitable storage device, many embodiments described herein relate to a SSD utilizing a mixed mode scheme as described herein.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A storage device, comprising:
   one or more communication channels suitable for connection with a computing device;
   a plurality of memory devices within a memory array;
   a controller configured to provide access to the plurality of memory devices within the memory array;
   wherein the controller operates in a plurality of mixed modes, and wherein each mixed mode is associated with a different level of performance;
   wherein the plurality of mixed modes comprises a single-level cell (SLC) mode, and one of: a double-level cell (MLC) mode, a triple-level cell (TLC) mode, or a quad-level cell (QLC) mode;
   wherein the SLC mode is configured to store intermediate data;
   wherein each block of a plurality of blocks of the storage device has a first counter to track SLC mode program/erase cycles and a second counter to track multiple bit per cell mode program/erase cycles;
   wherein values of the first and second counters remain balanced until a maximum threshold number of program/erase cycles of the SLC mode is reached; and
   wherein after the maximum threshold number of program/erase cycles of the SLC mode is reached, the block is retired from use in SLC mode and only operates in multiple bit per cell mode thereafter.

2. The storage device of claim 1, wherein the intermediate data comprises parity data.

3. The storage device of claim 1, wherein each mixed mode is selectable by the computing device and further comprises one or more predetermined values.

4. The storage device of claim 1, wherein a second data block of the plurality of data blocks is used in the SLC mode to store a parity data block if the second data block has a corresponding TLC cycle count greater than other data blocks.

5. The storage device of claim 1, wherein a pair of SLC data blocks are configured into the TLC mode to maintain a program/erase (P/E) cycle count for the SLC data blocks that is equal to a P/E cycle count for one or more TLC data blocks.

6. A storage device, comprising:
   a controller configured to direct the storage device to:
      utilize a mixed mode programming method to store data within a plurality of data blocks within the storage device;
      detect one or more errors during data transfer; and
      wherein the storage device is directed to operate a plurality of data blocks in a plurality of mixed modes, wherein each mixed mode is associated with a different level of performance;
      wherein the plurality of mixed modes includes a single-level cell (SLC) mode and one of: a double-level cell (MLC) mode, a triple-level cell (TLC) mode, or a quad-level cell (QLC) mode;
      wherein the SLC mode is used for storing intermediate data;
      wherein each block has a first counter to track SLC mode program/erase cycles and a second counter to track multiple bit per cell mode program/erase cycles; and
      wherein values of the first and second counters remain balanced until a maximum threshold number of program/erase cycles of the SLC mode is reached; and
      wherein after the maximum threshold number of program/erase cycles of the SLC mode is reached, the block is retired from use in SLC mode and only operates in multiple bit per cell mode thereafter.

7. The storage device of claim 6, wherein the intermediate data is comprised of parity data.

8. The storage device of claim 6, wherein the plurality of mixed modes further comprises one or more predetermined values.

9. The storage device of claim 6, wherein a second data block of the plurality of data blocks is used in the SLC mode to store a parity data block if the second data block has a corresponding TLC cycle count greater than other data blocks.

10. The storage device of claim 6, wherein a pair of SLC data blocks are allocated into the TLC mode to maintain a P/E cycle count for the pair of SLC data blocks that is equal to a P/E cycle count for one or more TLC data blocks.

11. A method of evenly balancing a mixed mode in a storage device, comprising:
   evaluating a plurality of data blocks within a memory array to be used in the mixed mode, wherein the mixed mode includes a plurality of modes, and wherein the plurality of modes includes a SLC mode and one of a two-or-more-bits-per-cell (2+LC) mode;
   determining a first block within the plurality of blocks that has a SLC cycle count that is greater than a corresponding SLC cycle count of other blocks;
   erasing the first block into an erased 2+LC data block in the 2+LC mode;
   determining a second block within the plurality of blocks that has a 2+LC cycle count that is greater than a corresponding 2+LC cycle count of the other blocks;
   erasing the second block into an erased SLC block in the SLC mode;

allocating, in the SLC mode, the second block for storing intermediate data;

wherein each block has a first counter to track SLC mode program/erase cycles and a second counter to track 2+LC mode program/erase cycles; and wherein values of the first and second counters remain balanced until a maximum threshold number of program/erase cycles of the SLC mode is reached; and wherein after the maximum threshold number of program/erase cycles of the SLC mode is reached, the block is retired from use in SLC mode and only operates in multiple bit per cell mode thereafter.

12. The method of claim 11, wherein the SLC mode has a higher performance as compared to performance of the 2+LC mode.

13. The method of claim 11, wherein the intermediate data is comprised of parity data.

14. The method of claim 13, wherein the first counter of the second block is used in the SLC mode when the second block does not exceed a SLC threshold count.

15. The method of claim 14, wherein the first counter of the second block is not used in the SLC mode when the second block does exceed the SLC threshold count.

16. The method of claim 15, wherein, if the first counter of the second block does exceed the SLC threshold count, the second block is allocated back into the 2+LC mode.

* * * * *